(12) United States Patent
Adams

(10) Patent No.: US 7,389,345 B1
(45) Date of Patent: Jun. 17, 2008

(54) FILTERING APPROACH FOR NETWORK SYSTEM ALARMS

(75) Inventor: Mark Adams, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 832 days.

(21) Appl. No.: 10/400,112

(22) Filed: Mar. 26, 2003

(51) Int. Cl.
*G06F 15/173* (2006.01)

(52) U.S. Cl. .................................. 709/224; 709/223

(58) Field of Classification Search ................. 709/224, 709/223
See application file for complete search history.

(56) References Cited

U.S. PATENT DOCUMENTS

| | | | |
|---|---|---|---|
| 5,737,319 A | 4/1998 | Croslin et al. | |
| 5,761,502 A | 6/1998 | Jacobs | |
| 5,819,019 A | 10/1998 | Nelson | |
| 5,821,937 A | 10/1998 | Tonelli et al. | |
| 5,848,243 A | 12/1998 | Kulkarni et al. | |
| 5,922,079 A | 7/1999 | Booth et al. | |
| 6,058,426 A | 5/2000 | Godwin et al. | |
| 6,170,011 B1 | 1/2001 | Macleod Beck et al. | |
| 6,223,219 B1 | 4/2001 | Uniacke et al. | |
| 6,229,540 B1 | 5/2001 | Tonelli et al. | |
| 6,263,314 B1 | 7/2001 | Donner | |
| 6,347,374 B1 | 2/2002 | Drake et al. | |
| 6,363,421 B2 * | 3/2002 | Barker et al. | 709/223 |
| 6,381,250 B1 | 4/2002 | Jacobson et al. | |
| 6,385,609 B1 | 5/2002 | Barshefsky et al. | |
| 6,385,652 B1 | 5/2002 | Brown et al. | |
| 6,393,425 B1 | 5/2002 | Kelly | |
| 6,401,120 B1 | 6/2002 | Gamache et al. | |
| 6,457,050 B1 | 9/2002 | Cowan et al. | |
| 6,470,388 B1 | 10/2002 | Niemi et al. | |
| 6,530,024 B1 | 3/2003 | Proctor | |
| 6,532,554 B1 | 3/2003 | Kakadia | |
| 6,598,184 B1 | 7/2003 | Merget et al. | |
| 6,697,087 B1 | 2/2004 | Kelly | |
| 6,732,299 B1 | 5/2004 | Mbarki | |
| 6,775,552 B2 | 8/2004 | Link, II | |

(Continued)

OTHER PUBLICATIONS

U.S. Appl. No. 10/335,466; Mark Adams; *Network Model Audit and Reconciliation Using State Analysis*; Filed Dec. 31, 2002.; Specification 33 pages (including title page).and 1 drawing page.

(Continued)

*Primary Examiner*—John Follansbee
*Assistant Examiner*—Dhairya A Patel

(57) ABSTRACT

A method for creating an updateable report representing the alarm status of a network. Network alarms are categorized based on the source and type of alarm, the alarms are placed in a filtering system based on source and type, selected alarms are replaced with alarm representations, and a report is updated with alarm representations. The filtering system comprises non-temporal, temporal, and linkage-based filtering. Non-temporal filtering includes de-duplication, clear message mapping, and classification. Temporal filtering includes frequency-based and cycling-based filtering. Linkage-based filtering includes internal linkage-based and external linkage-based filtering. The network can comprise the interconnected networks of an enterprise or of a single domain of an enterprise. The domain can comprise a business domain or operating system domain. The network can comprise a group of client computers connected to a server computer. The report can be displayed on a computer screen or can be sent to another location for further processing.

37 Claims, 1 Drawing Sheet

U.S. PATENT DOCUMENTS

| | | |
|---|---|---|
| 6,775,701 B1 | 8/2004 | Pan et al. |
| 6,789,257 B1 | 9/2004 | MacPhail |
| 6,834,304 B1 | 12/2004 | Nisbet et al. |
| 6,836,798 B1 | 12/2004 | Adams |
| 6,847,996 B2 | 1/2005 | Brunet et al. |
| 6,865,517 B2 | 3/2005 | Bantz et al. |
| 6,895,529 B2 | 5/2005 | Egolf et al. |
| 6,920,506 B2 | 7/2005 | Barnard et al. |
| 6,950,865 B1 | 9/2005 | Depaolantonio |
| 6,981,039 B2 * | 12/2005 | Cerami et al. ............... 709/223 |
| 2002/0010767 A1 | 1/2002 | Farrow et al. |
| 2002/0013702 A1 | 1/2002 | Lee et al. |
| 2002/0103901 A1 | 8/2002 | Yoshida |
| 2002/0116485 A1 | 8/2002 | Black et al. |
| 2002/0147801 A1 | 10/2002 | Gullotta et al. |
| 2002/0157035 A1 | 10/2002 | Wong et al. |
| 2003/0005331 A1 | 1/2003 | Williams |
| 2003/0135382 A1 * | 7/2003 | Marejka et al. ................. 705/1 |
| 2003/0158765 A1 | 8/2003 | Ngi et al. |
| 2004/0003078 A1 | 1/2004 | Todd et al. |
| 2004/0098474 A1 | 5/2004 | Galou et al. |
| 2004/0107277 A1 | 6/2004 | Levesque et al. |
| 2004/0122926 A1 | 6/2004 | Moore et al. |
| 2005/0076394 A1 | 4/2005 | Watson et al. |

OTHER PUBLICATIONS

U.S. Appl. No. 10/335,321; Mark Adams; *Network Model Reconciliation Using State Analysis*; Filed Dec. 31, 2002; Specification 35 pages (including title page) and 1 drawing page.

U.S. Appl. No. 10/424,626; Mark Adams; *Orphaned Network Resource Recovery Through Targeted Audit and Reconciliation*; Filed Apr. 28, 2003; Specification 32 pages (including title page) and 1 drawing page.

Grillo et al, "Teletraffic Engineering for Mobile Personal Communications in ITU-T Work: The Need to Match Practice and Theory", IEEE 1998, pp. 38-58.

Glitho, "Isolating Faulty Routing Tables in SS7 Networks: Present and Future", IEEE 1996, pp. 98-104.

Cohn, "Auditing Control Performance of Interconnected Areas Utilizing the Component Concept and its Decomposition and Evaluation Techniques, Part I: Audit Technology and Field Test", IEEE 1988, pp. 581-587.

Israel et al, "Configuration Management of Large IP Telephone Networks", IEEE, 2000, pp. 435-446.

Lee et al, "Information-Theoretic Measures of Anomaly Detection", IEEE, 2001, pp. 130-143.

Office Action dated Sep. 8, 2006, 13 pages, U.S. Appl. No. 10/400,111, filed on Mar. 26, 2003.

Office Action dated Mar. 7, 2007, 17 pages, U.S. Appl. No. 10/400,111, filed on Mar. 26, 2003.

Final Office Action dated Aug. 22, 2007, 18 pages, U.S. Appl. No. 10/400,111, filed on Mar. 26, 2003.

Adams, Mark, Patent Application entitled "Filtering Approach for Network System Alarms Based on Lifecycle State", filed Mar. 26, 2003, U.S. Appl. No. 10/400,111.

* cited by examiner

FILTERING APPROACH FOR NETWORK SYSTEM ALARMS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the management of network alarms. More particularly, embodiments of the present invention provide a method and apparatus for automatically filtering the alarms in a network.

BACKGROUND OF THE INVENTION

Telecommunications networks, computer networks, and other networks typically include elements such as ATM switches, frame relay switches, voice switches, digital cross connect switches, multiplexers, routers, servers, and other equipment for processing and transmitting data. Network elements typically contain self-monitoring circuitry and software that can detect internal and external conditions affecting the elements and activate messages that document these conditions. Many of these messages indicate potentially abnormal or erroneous conditions from the local perspective of the reporting resource. Depending on the context, these messages might represent predictable noise requiring no action or might indicate a major network failure requiring immediate attention. Any type of message that conveys evidence that an error condition might exist can be referred to as an alarm. Technicians typically investigate a certain number of alarms to determine their cause and undertake corrective action. However, in large networks, the number of alarms can overwhelm the staff of technicians charged with operating and maintaining the network. The wide variety of protocols, such as SNMP, CMW, CORBA, log files, Telnet/command line interfaces, and proprietary interfaces, used to deliver alarm information can increase the difficulty of gathering and handling of alarm data. Since manually investigating large numbers of different types of alarms to distinguish significant alarms from insignificant alarms can be time-consuming, labor-intensive, expensive, and often impossible, technicians often attempt to focus their efforts on the most severe alarms, ignoring a significant number of messages. This can leave many problems undetected until specific complaints are received from impacted network users.

SUMMARY OF THE INVENTION

An embodiment of the invention is a method for creating an updateable report representing the alarm status of a network. The method can comprise categorizing all alarms generated in the network based on the source and type of alarm, placing the alarms in at least one filtering system based on source and type, replacing selected alarms with alarm representations, and updating a report with the alarm representations. The filtering system can include any or all of a group comprising non-temporal filtering, temporal filtering, and linkage-based filtering. Non-temporal filtering can include any or all of a group comprising de-duplication, clear message mapping, and classification. Temporal filtering can include any or all of a group comprising frequency-based filtering and cycling-based filtering. Linkage-based filtering can include any or all of a group comprising internal linkage-based filtering and external linkage-based filtering. The network can comprise the interconnected networks of an enterprise or of a single domain of an enterprise. The domain can comprise a business domain of the enterprise or an operating system domain of the enterprise. The network can comprise a group of client computers connected to a server computer. The report can be displayed on a computer screen or can be sent to another location for further processing.

An alternative embodiment is a method for monitoring the alarm status of a network that comprises capturing alarms generated by elements of the network, applying at least one filter to the alarms which generates alarm representations for selected alarms, displaying the generated alarm representations and a selection of the alarms which have passed through the filters, monitoring the display, and taking action in response to the displayed alarm representations and alarms. Human monitors can generate alarm representations and can group selected alarms subordinate to the alarm representations.

DETAILED DESCRIPTION OF THE PREFERRED EMBODIMENTS

Figure 1:
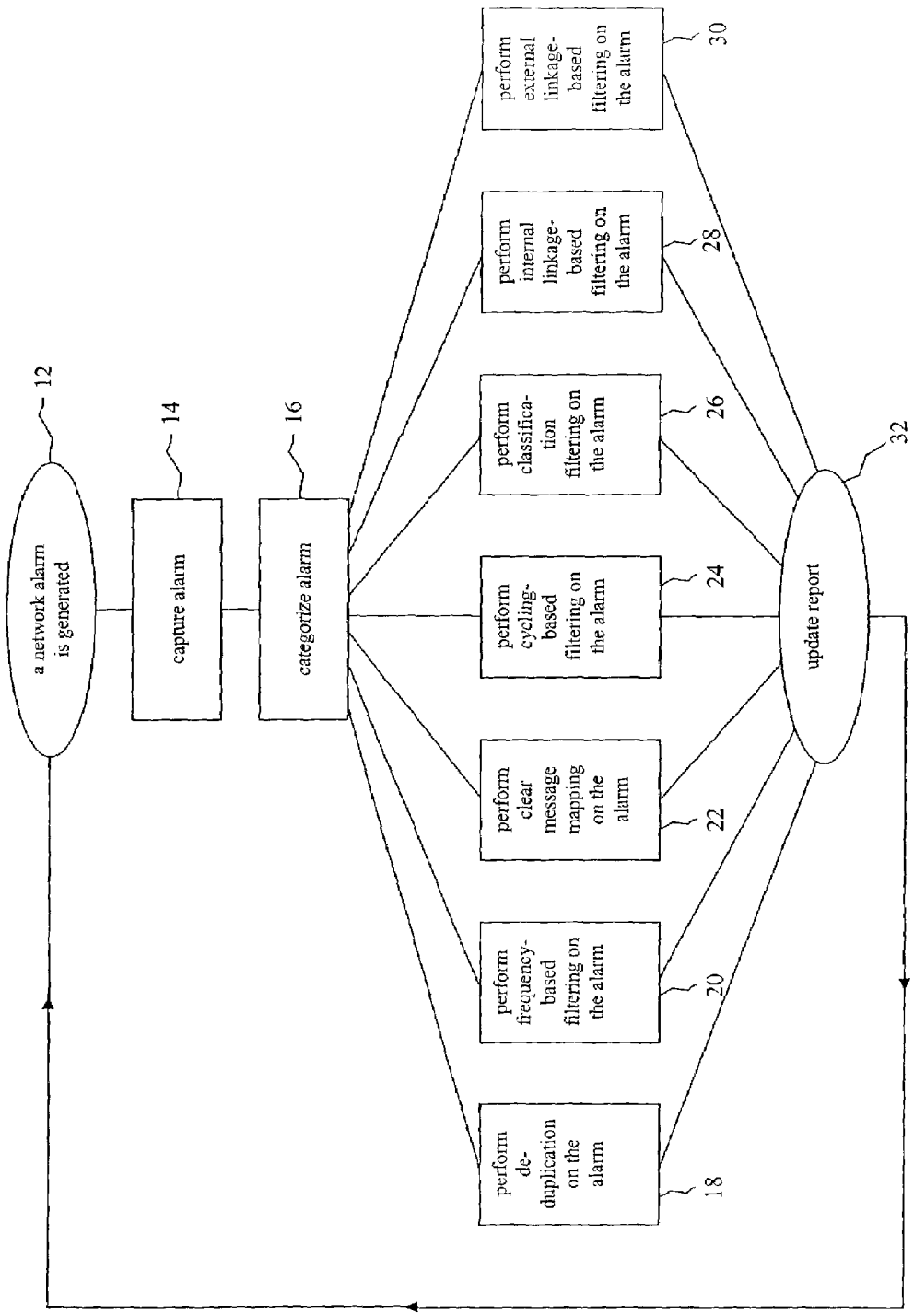
FIG. 1 is a flowchart showing steps in an embodiment of the filtering approach for network system alarms.

The filtering approach for network system alarms reduces the manual intervention needed to manage alarms. All network alarms are captured and then categorized based on the source and the type of the alarm. Depending on their category, alarms are then sent through one or more filtering systems that can reduce the number of alarms displayed by replacing the underlying alarms coming from the network with alarm representations. The reduction in the number of alarms may be referred to herein as removing alarms meeting certain criteria or selecting alarms meeting certain criteria. These terms are intended to be understood as effectively complementary, where selecting for certain criteria is intended to have the same meaning as removing all alarms which do not meet those criteria. The filtering systems may be viewed as components of a single overall filtering system or as a sequence of separate filtering systems working in concert or as a combination of the two. The use of the term system in this disclosure is not intended to provide an indication of whether the coding is integrated, distributed, or modular. In a preferred embodiment, both alarms and alarm representations are retained even when not selected for display or when filtered from display. For the purposes of this disclosure, an alarm is recognized as a report from a network element. By comparison, an alarm representation is a system report based on an alarm or a plurality of alarms providing information to system technicians or operators either in addition to the simple alarm or in a more concise fashion than a collection of simple alarms. In this sense, an alarm representation may be defined as a single alarm that acts as a surrogate for multiple underlying alarms and as a newly generated alarm providing additional information about underlying or companion alarms. The use of alarm representations rather than the underlying alarms reduces the volume of alarm-related information, thus reducing the effort required to process alarms. This reduction occurs by hiding the underlying alarms associated with an alarm representation from view, allowing a technician to see only a single message. In an embodiment of the invention, the underlying alarms associated with an alarm representation can be examined by specific request. In some embodiments, for the purposes of filtering, both alarms and alarm representations may be acted upon. Thus, an alarm representation created by one filtering process may be, in turn, itself filtered and/or replaced by another alarm representation.

The type of alarm representation depends on the type of filtering system. For example, some filtering systems may allow one alarm of a particular type to pass through but mask out all other alarms of the same type. Other filtering systems may generate a new alarm to substitute for multiple alarms of a particular type. The alarm representations can be used to update a report that represents the status of the network. The report can take the form of a display that appears on a computer screen, a message which is transmitted or otherwise made available for review, or a message that is transmitted elsewhere for automated processing. The report can be updated each time a new alarm representation is generated so that technicians can easily see high-frequency alarms summarized into a single alarm representation. For the purposes of this disclosure, the use of a single alarm while masking duplicate alarms constitutes the use of a single alarm representation. In one embodiment, the masked duplicate alarms remain accessible as underlying information linked to the single alarm representation.

In an embodiment of the invention, seven different types of filtering can be used to process network alarms. Each type of filtering can be used independently or any combination of the seven types can be used. The first five of the filtering types may be generally categorized as non-temporal and temporal filters, where non-temporal filters do not expressly rely on a time component. Temporal filters, by comparison, consider time factors underlying events as a threshold to accomplish a more complex level of filtering.

In one type of non-temporal filtering, which can be referred to as de-duplication, repetitive alarms are eliminated. Many elements retransmit previously sent alarms until the conditions that triggered the alarm are cleared. These additional alarms can become noise, masking other problems. With de-duplication, a defined set of matching fields is given to each alarm type and these fields are embedded in the alarm messages. These fields allow specific types of alarms to be easily identified so that multiple alarms of the same type can be replaced by a single alarm representation. In an embodiment of the invention, a counter can be displayed to keep track of the number of similar alarms that have been masked.

One type of temporal filtering deals with the frequency of alarm arrival. Repeated alarms may arrive at different rates. Alarms of a given type from a given source may be of no significance when the rate of arrival is infrequent, but may become critical when the arrival frequency rises sharply. Even informational alarms may become significant if their rate of arrival peaks. In frequency-based alarm filtering, policies on alarm frequency are created. A counting system determines the number of alarms that occur in a period of time and compares that number to a number established in a policy. Alarm messages that arrive at a frequency lower than that specified in the policy can be ignored. Alternatively, such alarms can be aggregated into a single representation. When the frequency of an alarm exceeds the established threshold, an additional alarm can be generated and used as an additional (potentially higher priority) alarm representation. In one embodiment, different policies and thresholds can be applied to alarms from different sources or of different types.

De-duplication and frequency-based filtering are similar in that they both deal with representing multiple alarms of the same or similar type by a single alarm. The difference between the two types of filtering is that frequency-based filtering is concerned with the temporal aspect of the alarms. In de-duplication, repetitive alarms of a particular type are masked regardless of when other alarms of that type occurred. In frequency-based filtering, it is the number of alarms of a particular type or from a particular source that occur over a particular time period that determines whether or not an alarm representation is generated.

Elements can send "clear" messages to indicate that a previous alarm condition no longer exists. In a non-temporal filtering system that can be referred to as clear message mapping, mapping tables can be maintained that relate clear messages to the types of alarms to which they apply. Software-based logic can be used to search the mapping tables and automatically flag previously received alarms as cleared, indicating that they have become inactive. This can eliminate the need for manual intervention. Clear messages typically originate from the same element as the original alarm and thus contain identifiers of their source, eliminating the need for matching alarms with element topology data from an external source. Based on this, the cleared alarm or alarm representation may be removed from the alarm status report.

Under certain circumstances, an element can enter a cyclic pattern of alarm activation and clearing. That is, an alarm can be followed closely by a clear message and this pattern can continuously repeat. Such a scenario can indicate a problem requiring direct intervention. In a temporal filtering system that can be referred to as cycling-based filtering, policies on cycling frequency are created. A counting mechanism determines the number of alarm/clear cycles that occur in a period of time and compares that number to a number established in a policy. When the number of alarm/clear cycles exceeds the established level, an additional alarm can be generated as the alarm representation. A severity escalation mechanism can also be included so that when the number of alarm/clear cycles exceeds the established level, the severity (also referred to as the priority) of the additional alarm representation is increased beyond the level of the original alarms.

As is the case with de-duplication and frequency-based filtering, clear message mapping and cycling-based filtering are similar except for the temporal aspect of how they deal with alarms. In clear message mapping, clear messages are mapped to the alarms to which they correspond regardless of how often the clear messages, or their base alarms, occur. In cycling-based filtering, it is the frequency at which alarms are activated and then cleared that determines whether or not an alarm representation is generated.

An additional type of non-temporal filtering which may be employed is Classification filtering. Classification filtering may be applied against the source (for example element type or geographic region) of the message or may also be applied against the type of message being sent regardless of source. Classification filtering may be used by an operations group to mask alarms that are not meaningful to particular staff roles. For example, although the entire staff may use a common tool for monitoring, particular sub-teams may be assigned to monitor only specific types of network elements. For these individuals, classification filters can be used to remove all alarms and alarm representations from display that do not result directly from the elements types within their domain of interest. Alternatively, groups might be assigned to support elements within a specific geographic region, so all alarms from elements outside that region would not be displayed to them.

Classification by message type is a more fined-grained version of the same principle. Some elements may produce informational messages of no interest in a particular operations context. For example, a switch might send a message each time its cabinet door is opened or closed. When no policy or business rule has been developed that would make an alarm meaningful, many groups prefer to remove that alarm type from display. For one organization the opening or closing of a cabinet door can be used as evidence of human presence which could then be checked against security policies, especially for unmanned sites, where a violation of policy might trigger intervention, like a call to the police or to a security firm for investigation. Yet others might have no such requirements and simply want the door-related messages removed from the display. In almost every case, a scenario can be imagined where a message type provides useful information, yet in practical settings, certain types of alarms are of no value. Environmental alarms might be handled by one organization while service-related alarms are handled by another; each would use an appropriate message type based filter.

Internal linkage-based filtering deals with messages that come from different components within the same element. It requires a model of the element, including internal components, to determine alarm relationships. When a component fails, some elements will send an alarm for that failed component and a separate alarm for each of the other locally impacted components or services. While these additional messages can be helpful for impact analysis, they can often distract and confuse operators searching for root causes. Systematically hiding these additional messages from surveillance displays and downstream processes allows for faster problem correction. The original alarm from the original failed component can then act as the alarm representation. Internal linkage-based filtering requires the existence of a topology that describes the interconnections among all components within an element. Information regarding which alarms are generated by which components is also needed, as well as a model of which alarm types relate to each other. An additional alarm can be generated to notify operators that other alarms have been suppressed.

As an example of internal linkage-based filtering, within a network element, such as an ATM switch or a frame relay switch, several circuit cards might be present on a single backplane. Within each ATM card, for example, multiple ports might be present. The failure of an ATM card would result in each of the ports on the card becoming inoperable. The network element might have been designed to generate separate alarms for the failure of the card and for the failure of each of its ports. From the perspective of a network technician responsible for diagnosing and repairing equipment problems, the additional port alarms distract from the root problem. With internal linkage-based filtering, the alarms from the ports can be masked and/or subordinated to the card alarm. Software can be present that examines the topology of the ATM card and its component parts and recognizes that the alarms coming from the ports are likely to have been caused by the failure of the ATM card. The software can then ignore or remove from the display the alarms for the ports and use the alarm from the ATM card itself as an alarm representation. Alternatively, the alarms can be sent to a display where they can be examined by a technician who can decide whether the alarms from the ports can be safely removed from display.

External linkage-based filtering relates messages from multiple elements. Many protocols require synchronization signals or periodic status exchanges among elements in a network. These often specify that alarms be generated when signals are not properly received. Some protocols require the forwarding of special signals along the entire communications path of a service when a failure occurs at any point in the path. This signal forwarding alerts all elements along the path that a problem has occurred. Thus, a failure at one point in a network can cause alarms to propagate and cause sympathetic alarms to be generated by elements not actually responsible for the failure. External linkage-based filtering is intended to systematically hide sympathetic alarms from alarm monitoring mechanisms and downstream processes, while focusing operator attention on the most likely causes of the original alarm. In many cases, this may require the creation of a new alarm representation documenting the reason for the grouping of the other alarms. Knowledge of network element topology is needed to determine alarm relationships. Generally, this interconnected view of topology must be provided from an external source, such as a network model maintained within one or more network provisioning systems.

As an example of external linkage-based filtering, a communications chain between two points can comprise multiple elements connected in a serial fashion. Data can flow from one end point to the other through each of the elements in turn. Each element can have the capability to generate an alarm if it does not receive data when it expects to or if the data it receives appears to be invalid. Thus, if one element in a chain ceases to transmit data it can generate an alarm and can cause subsequent elements in the chain to also generate alarms when they fail to receive data from the previous element in the chain. The alarms from the subsequent elements can be considered superfluous since they would be generated by the fact that the original element ceased to transmit data and that element would have already generated its own alarm. With external linkage-based filtering, the alarms from the subsequent elements can be identified as related to one another and masked and/or subordinated under a single alarm representation. Software can be present that examines the topology of the elements in the chain and recognizes that the alarms coming from subsequent elements of the chain are likely to have been caused by the failure of the original element to transmit data. The software can then suppress the subsequent alarms and use the original alarm as an alarm representation.

While the preceding example used a simple serial chain of elements for illustrative purposes, in actual practice the topology of the elements is likely to be more complicated. Each element might be connected to numerous other elements in a highly complex configuration. In addition, numerous different types of alarms might occur. This means that an accurate topological map and a thorough understanding of all alarms that might occur are preferable in order for external linkage-based filtering to be fully implemented.

Internal linkage-based filtering and external linkage-based filtering can be referred to collectively as linkage filtering. The two types of linkage filtering are similar in that both involve the display masking and/or subordination of an alarm in an element or component that results from conditions in another element or component. The difference between the two types of linkage filtering is that internal linkage-based filtering deals with components within a single element. Alarms from dependent components within the element are consolidated into a single alarm representation. External linkage-based filtering deals with multiple elements. Alarms from dependent components across multiple elements are consolidated into a single alarm representation.

For either or both of the linkage-based filtering approaches, partial implementations may provide advantages even in the absence of full implementation. Since each typically involves detailed or complex rule making and/or mapping, rules or maps may be constructed for alarms or networks or components which are causing particular issues to assist in reducing noise from those places. As more time and resources are available and as different or new issues come to the fore as ripe for filtering, additional linkages for filtering may be added. This kind of incremental implementation for linkage based filtering may provide the same advantages with a more practical budget and flexible approach in moving towards incrementally improving the alarm status report and the environment for the technicians using the alarm status report.

The seven types of filtering can be implemented individually or in any combination. In one embodiment, non-temporal filtering (such as de-duplication, clear-message mapping, and/or classification filtering) and temporal filtering (such as frequency-based filtering and/or cycling-based filtering) are used in combination with linkage filtering (such as external-linkage filtering and/or internal linkage filtering). In a preferred embodiment, de-duplication, frequency-based filtering, clear message mapping, and cycling-based filtering are used in combination with linkage filtering. In this embodiment, when an alarm is generated it is captured and categorized according to the type of filtering that can be performed on it. The appropriate type or types of filtering are then performed on the alarm. Filters can be applied in any order and in either a serial or a parallel manner. After the filters have been applied, a report can be created that displays the alarm representations that represent the underlying alarms. This process can continue in an iterative manner in which the report is continuously updated as alarms are generated, captured, categorized, and filtered.

In an embodiment, the underlying alarms can be included in a report in addition to the alarm representations. This gives an alarm-monitoring technician the ability to view the underlying alarms if desired. If the report is displayed on a computer screen or other visual medium, an option can be provided that allows the viewing of the underlying alarms, the alarm representations, or both. In a preferred embodiment, both alarm representations and underlying alarms that have not been subordinately linked to an alarm representation are displayed. In this embodiment, if the proper criteria for subsequent filter rules are met, alarm representations may be aggregated under other alarm representations in a manner similar to the way underlying alarms can be aggregated under an alarm representation.

An embodiment of the invention is illustrated in FIG. 1. In box 12, an alarm is generated by an element or a component of an element in a network. The alarm is captured in box 14. In box 16, the alarm is categorized according to which type or types of filtering can be performed on it. If de-duplication can be done on the alarm, de-duplication is performed in box 18. If frequency-based filtering can be done on the alarm, frequency-based filtering is performed in box 20. If clear message mapping can be done on the alarm, clear message mapping is performed in box 22. If cycling-based filtering can be done on the alarm, cycling-based filtering is performed in box 24. If classification filtering can be done on the alarm, classification filtering is performed in box 26. If internal linkage-based filtering can be done on the alarm, internal linkage-based filtering is performed in box 28. If external linkage-based filtering can be done on the alarm, external linkage-based filtering is performed in box 30. Any one type or any combination of types of filtering shown in boxes 18, 20, 22, 24, 26, 28, or 30 can be performed. After any type of filtering or any combination of filtering types is performed, a report can be updated as shown in box 32. This process of alarm generation, alarm capture, alarm categorization, alarm filtering, and report updating can occur in a loop that repeats to handle all new and existing alarms.

In addition to the seven types of alarm filtering described above, alarms can be filtered based on the operational or lifecycle state of the elements in a network. State-based filters can block from the display (or can specifically filter for depending on the needs of the particular user) elements not yet fully deployed or in a maintenance state. At the highest level the general categories of lifecycle state can be defined as: operational and non-operational. Non-operational states may be generally divided into pre-acceptance and post-acceptance. Pre-acceptance non-operational states may include one of the following: planned (not yet deployed), deployed (physically fielded, but not yet verified), or tested (verified, but not yet operationally accepted). Post-acceptance states may include one of the following: blocked (physically present but inhibited from use) and defective (physically present, but unusable). Operational states may be generally divided into normal (operating as intended) or maintenance. Maintenance states may include testing (currently being tested), scheduled maintenance (currently being maintained), emergency recovery (unscheduled maintenance), or reallocated (temporarily reconfigured differently than recorded by provisioning records, for example to act as a work-around to solve a problem with another portion of the network). These states may be recorded and updated (or tracked) independently for all or selected resources. They may be recorded and updated as an element of a network model (topology, inventory, or combination of both) modeling the network which includes the subject resources. They may be recorded and updated as an element of a provisioning or configuration record which includes the subject resources. The filtering system can then refer to the model, records, or independently stored state information to assist in evaluating various alarms and/or alarm representations. Any of a number of possible approaches to this storage and access would be understood to those of skill in the art, and would provide many or all of the advantages sought from incorporating state-based filtering. States could be tracked for at least a portion of the elements in a network or for all of the elements in a network. At least a portion of the alarms generated by elements for which the lifecycle state is tracked may be filtered for state or all of the alarms generated by tracked elements may be filtered for state.

States can be used to provide different alarm filtering views, useful in addressing different operational tasks. Many alarms can occur during the pre-acceptance processes of installing and deploying new elements. These are typically of interest only to operational personnel validating and accepting new elements and can be filtered out of the standard alarm monitoring process or actively selected for more specialized tasks. For example, a remote operator working with field technicians to verify the correct configuration of newly configured elements can use a filtered view focusing on elements in the pre-acceptance state of deployed. However, for monitoring of normal operations, alarms from all resources that are not in an operational state are typically filtered as noise.

Even within the operational state, there may be transient changes to resources which may be helpful to distinguish and filter for. These temporary state changes relate to what may be referred to here collectively as maintenance activities, by which is meant activities required to effectively operate, maintain, and repair a network including testing, maintenance, emergency recovery, and reallocation. Generally these activities temporarily disrupt normal network operations, and often cause conditions that trigger the generation of additional network alarms. Because of the special nature of these activities and the predictable alarm responses, it may be desirable to separate these alarms from normal monitoring to prevent confusion. These alarms might otherwise cause an operator to attempt unnecessary repairs that might compromise the other special-purpose activities that indirectly caused the alarms. Network maintenance is an example of an activity that can also trigger additional alarms. During network change activity, selected resources may be disconnected or changed as part of a larger reconfiguration activity. These intermediate changes often leave services or resources in abnormal states until other configuration activities are completed. In some embodiments, alarms from these resources can be treated as the expected side effects of the maintenance activities and can also be filtered from standard alarm monitoring. However, special maintenance views can also be helpful in answering questions about whether particular resources should be a concern or not during a maintenance period, say in response to an unexpected customer complaint that arrives during a maintenance period. In one embodiment of operations, some combination of state-based filtering may be used independently from the seven filters previously discussed. In other embodiments of operation, a combination of state-based filtering and any or all of the components or sub-components of non-temporal, temporal, and linkage-based filtering as described above may be used.

In an alternative improvement to the alarm status report and alarm status filtering and reporting system, technicians may be provided the ability to manually group related alarms under a single alarm representation for reporting purposes. In this manner, a technician may reduce the number of reported alarms based on his own evaluation of related alarms. This could simplify the display for other technicians and also reduce the chance that multiple technicians will end up working on the same problem by starting from different, but related, alarms. In yet an additional embodiment, records could be kept of the alarms manually combined and where consistent or repeating patterns are observed, plans could be made to implement new filters where practical, particularly linkage-based filters, to group these alarms automatically in the future.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

What is claimed is:

1. A method for creating an updateable report representing the alarm status of a network comprising:
   categorizing all alarms generated in the network based on the source and type of alarm;
   placing the alarms in at least one filtering system based on source and type, wherein the filtering system replaces selected alarms with alarm representations, and wherein the filtering system includes each of a group of filtering systems comprising:
   a temporal filtering system, wherein the temporal filtering system includes at least one temporal filter that is selected from a group of temporal filters comprising:
      a frequency-based filter that generates a temporal alarm representation that replaces multiple alarms in response to a quantity of the multiple alarms exceeding a threshold within a period of time; and
      a cycling-based filter that generates a second temporal alarm representation that replaces multiple alarms in response to a quantity of cycles of the multiple alarms exceeding a threshold within a period of time, wherein each cycle of the multiple alarms includes generating an alarm followed by clearing the alarm; and
   a linkage-based filtering system, wherein the linkage-based filtering system generates a linkage-based alarm representation that replaces sympathetic alarms generated by portions of the network impacted by a failure of a first portion of the network; and
   updating a report with the alarm representations.

2. The method of claim 1, wherein the linkage-based filtering system is an external linkage-based filtering system such that the portions of the network include elements within the network and the first portion of the network includes a first element in the network.

3. The method of claim 1, wherein the group of filtering systems further comprises:
   a non-temporal filtering system.

4. The method of claim 3, wherein the group of filtering systems further comprises:
   a classification filtering system.

5. The method of claim 3, wherein the non-temporal filtering system includes at least one non-temporal filter that is selected from a group of non-temporal filters comprising a de-duplication filter and a clear message mapping filter.

6. The method of claim 5, wherein the non-temporal filtering system includes each of the de-duplication filter and the clear message mapping filter.

7. The method of claim 5, wherein the de-duplication filtering system generates a de-duplication alarm representation that masks alarms that are repeated while an alarm condition is maintained, and
   wherein the clear message mapping filtering system that removes alarms or alarm representations in response to receiving a clear message from an originator of the alarms or alarms replaced by the alarm representations.

8. The method of claim 3, wherein the non-temporal filtering system includes at least one non-temporal filter that is selected from a group of non-temporal filters comprising a de-duplication filter, a clear message mapping filter, and a classification filter.

9. The method of claim 8, wherein the non-temporal filtering system includes each of the de-duplication filter, the clear message mapping filter, and the classification filter.

10. The method of claim 3, wherein the non-temporal filtering system includes each of a group of non-temporal filters comprising a de-duplication filter and a clear message mapping filter and wherein the temporal filtering system includes each of the frequency-based filter and a cycling-based filter.

11. The method of claim 1, wherein the linkage-based filtering system includes at least one linkage-based filter that is selected from a second group of linkage-based filters comprising an internal linkage-based filter, wherein the portions of the network include components within an element and the first portion of the network includes a first component in the element, and an external linkage-based filter, wherein the portions of the network include elements within the network and the first portion of the network includes a first element in the network.

12. The method of claim 11, wherein the linkage-based filtering system includes each of the internal linkage-based filter and the external linkage-based filter.

13. The method of claim 1, wherein the temporal filtering system includes each of the frequency-based filter and the cycling-based filter.

14. The method of claim 1, wherein the network comprises the interconnected networks of an enterprise.

15. The method of claim 1, wherein the network comprises the interconnected networks of a single domain of an enterprise.

16. The method of claim 15, wherein the domain comprises a business domain of the enterprise.

17. The method of claim 15, wherein the domain comprises an operating system domain of the enterprise.

18. The method of claim 1, wherein the network comprises a group of client computers connected to a server computer.

19. The method of claim 1, wherein the report is displayed on a computer screen.

20. The method of claim 1, wherein the report is sent to another location for further processing.

21. A method for creating an updateable report representing the alarm status of a network comprising:
categorizing all alarms generated by one or more elements in a network based on the source and type of alarm;
placing the alarms in at least one filtering system based on source and type, wherein the filtering system replaces selected alarms with alarm representations, and wherein the filtering system includes each of a group of filtering systems comprising:
a non-temporal filtering system wherein the non-temporal filtering system includes at least one non-temporal filter that is selected from a group of non-temporal filters comprising:
a de-duplication filter that generates a de-duplication alarm representation that masks alarms that are repeated while an alarm condition is maintained; and
a clear message mapping filter that removes alarms or alarm representations in response to receiving a clear message from the one or more elements that originally generated the alarms or alarms replaced by the alarm representations; and
an external linkage-based filtering system that generates a linkage-based alarm representation that replaces sympathetic alarms generated by elements of the network impacted by a failure of a first element of the network; and
updating a report with the alarm representations.

22. The method of claim 21, wherein the non-temporal filtering system includes at least one non-temporal filter that is selected from a group of non-temporal filters comprising the de-duplication filter, the clear message mapping filter, and a classification filter.

23. The method of claim 22, wherein the non-temporal filtering system includes each of the de-duplication filter, the clear message mapping filter, and the classification filter.

24. The method of claim 23, wherein the classification filter masks alarms based on a source of the alarms, types of elements generating the alarms, a location of elements generating the alarms, or a type of the alarms.

25. The method of claim 21, wherein the non-temporal filtering system includes each of the de-duplication filter and the clear message mapping filter.

26. A method for creating an updateable report representing the alarm status of a network comprising:
categorizing all alarms generated in a network based on the source and type of alarm;
placing the alarms in at least one filtering system based on source and type, wherein the filtering system replaces selected alarms with alarm representations, and wherein the filtering system includes each of a group of filtering systems comprising:
a de-duplication filtering system that generates a de-duplication alarm representation that masks alarms that are repeated while an alarm condition is maintained;
a clear message mapping filtering system that removes alarms or alarm representations in response to receiving a clear message from an originator of the alarms or alarms replaced by the alarm representations;
a frequency-based filtering system that generates a temporal alarm representation that replaces multiple alarms in response to a quantity of the multiple alarms exceeding a threshold within a period of time; and
a cycling-based filtering system that generates a second temporal alarm representation that replaces multiple alarms in response to a quantity of cycles of the multiple alarms exceeding a threshold within a period of time, wherein each cycle of the multiple alarms includes generating an alarm followed by generating a clear message; and
updating a report with the alarm representations.

27. The method of claim 26, wherein the group of filtering systems further comprises:
a classification filtering system that masks alarms based on a source of the alarms, types of elements generating the alarms, a location of elements generating the alarms, or a type of the alarms.

28. A method for monitoring the alarm status of a network comprising:
capturing alarms generated by elements of the network;
applying at least one filter to the alarms wherein the filter generates alarm representations for selected alarms and wherein the filters include each of a group of filters comprising:
non-temporal filters, wherein the non-temporal filters include at least one non-temporal filter that is selected from a group of non-temporal filters comprising:
a de-duplication filter that generates a de-duplication alarm representation that masks alarms that are repeated while an alarm condition is maintained; and
a clear message mapping filter that removes alarms or alarm representations in response to receiving a clear message from corresponding ones of the elements that originally generated the alarms or alarms replaced by the alarm representations;
temporal filters, wherein the temporal filters include at least one temporal filter selected from a group of temporal filters comprising:
a frequency-based filter that generates a temporal alarm representation that replaces multiple alarms in response to a quantity of the multiple alarms exceeding a threshold within a period of time; and
a cycling-based filter that generates a second temporal alarm representation that replaces multiple alarms in response to a quantity of cycles of the multiple alarms exceeding a threshold within a period of time, wherein each cycle of the multiple alarms includes generating an alarm followed by clearing the alarm; and
linkage-based filters, wherein the linkage-based filters generate a linkage-based alarm representation that replaces sympathetic alarms generated by portions of the network impacted by a failure of a first portion of the network;

displaying the generated alarm representations and a selection of the alarms which have passed through the filters;

monitoring the display; and taking action in response to the displayed alarm representations and alarms.

29. The method of claim 28, wherein the non-temporal filters include at least one non-temporal filter selected from a group of non-temporal filters comprising the de-duplication filter, the clear message mapping filter, and a classification filter.

30. The method of claim 29, wherein the non-temporal filters include each of the de-duplication filter, the clear message mapping filter, and the classification filter.

31. The method of claim 29, wherein the classification filter masks alarms based on a source of the alarms, types of elements generating the alarms, a location of elements generating the alarms, or a type of the alarms.

32. The method of claim 28, wherein the linkage-based filters include at least one linkage-based filter selected from a group of linkage-based filters comprising an internal linkage-based filter and an external linkage-based filter.

33. The method of claim 32, wherein linkage-based filters includes each of the internal linkage-based filter and the external linkage-based filter.

34. The method of claim 28, wherein the non-temporal filters include each of the de-duplication and the clear message mapping filter.

35. The method of claim 28, wherein the temporal filters include each of the frequency-based filter and the cycling-based filter.

36. The method of claim 28, wherein the non-temporal filters include each of the de-duplication filter and the clear message mapping filter and wherein the temporal filters include each of the frequency-based filter and the cycling-based filter.

37. The method of claim 28, further comprising human monitors generating alarm representations and grouping selected alarms subordinate to the alarm representations.

* * * * *